No. 653,477. Patented July 10, 1900.
J. C. KANE & A. J. LIST.
STREET SWEEPER.
(Application filed Oct. 19, 1898.)
(No Model.) 3 Sheets—Sheet 1.
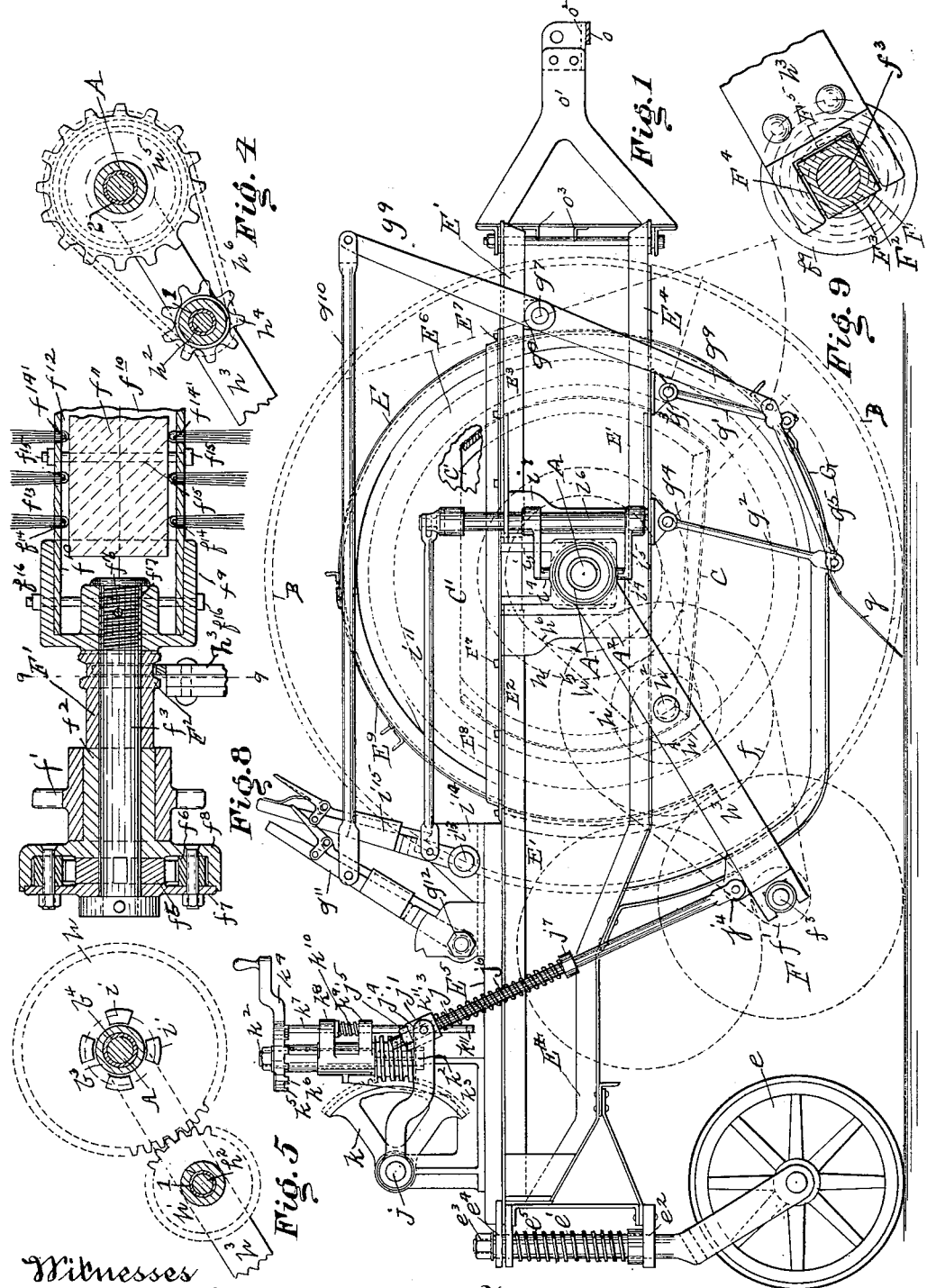
Witnesses
Lindsay deB. Little
J.B. Switzer
Inventors:
Joseph C. Kane
Anthony J. List
By J. N. Cooke,
Attorney

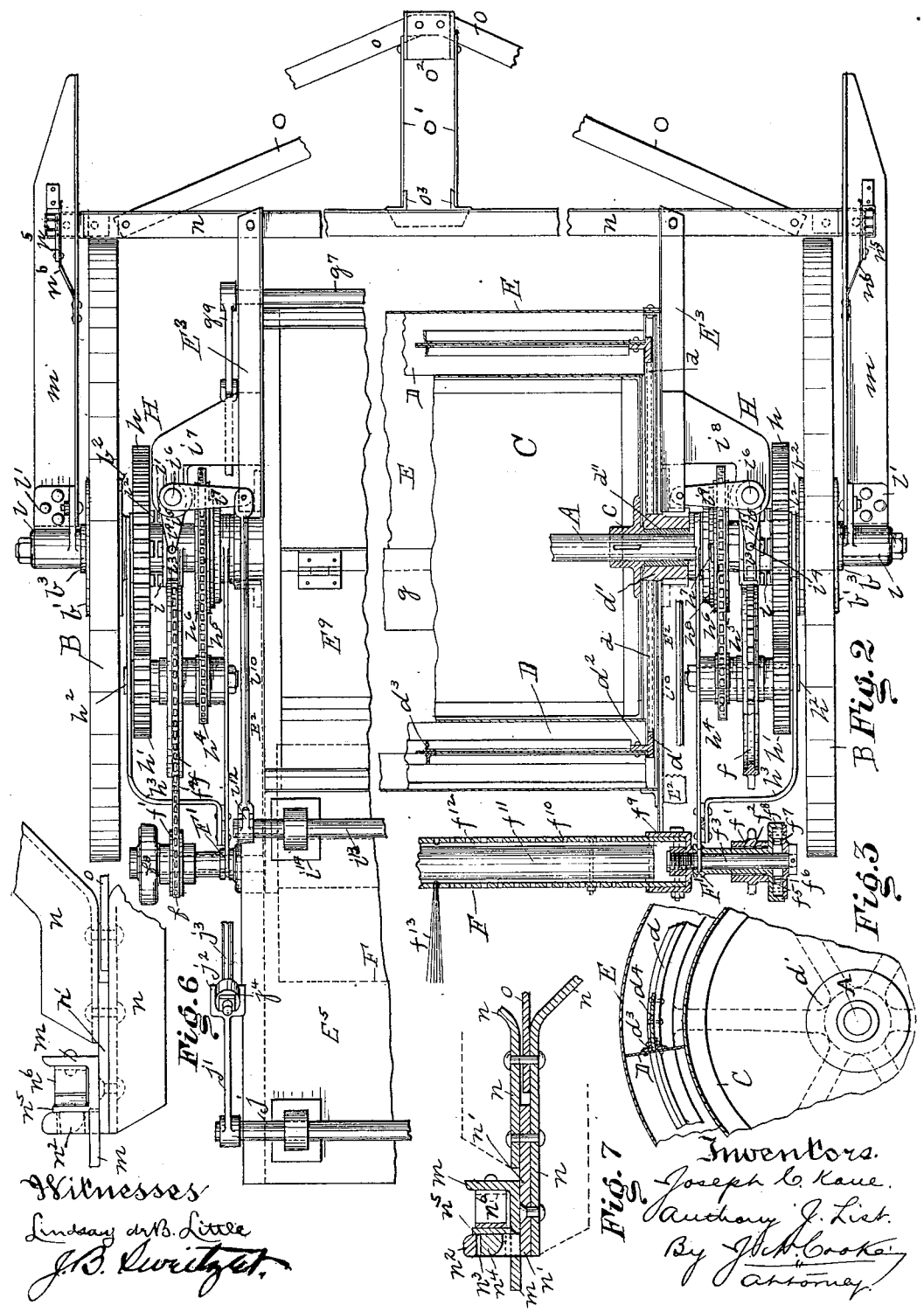

No. 653,477. Patented July 10, 1900.
J. C. KANE & A. J. LIST.
STREET SWEEPER.
(Application filed Oct. 19, 1898.)
(No Model.) 3 Sheets—Sheet 3.
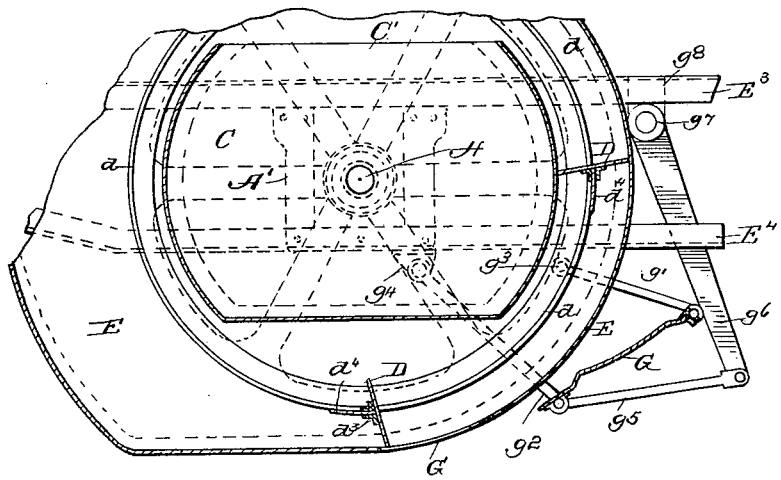
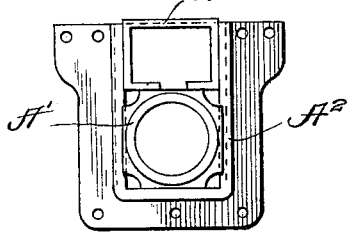
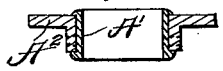
Witnesses:
J. M. Fowler Jr.
Thomas Neilson
Inventors
Joseph C. Kane
Anthony J. List
by W. B. Corwin,
Assoc. Atty

UNITED STATES PATENT OFFICE.

JOSEPH C. KANE AND ANTHONY J. LIST, OF ALLEGHENY, PENNSYLVANIA, ASSIGNORS, BY DIRECT AND MESNE ASSIGNMENTS, TO THE IMPROVED STREET SWEEPER COMPANY, OF PITTSBURG, PENNSYLVANIA.

STREET-SWEEPER.

SPECIFICATION forming part of Letters Patent No. 653,477, dated July 10, 1900.

Application filed October 19, 1898. Serial No. 694,000. (No model.)

*To all whom it may concern:*

Be it known that we, JOSEPH C. KANE and ANTHONY J. LIST, citizens of the United States, residing at Allegheny, in the county of Allegheny and State of Pennsylvania, have invented a certain new and useful Improvement in Street-Sweepers, of which the following is a specification.

Our invention relates to street-sweepers, and has special reference to what are known as "pick-up" machines—that is, machines for picking up the sweepings and storing the same on the sweeper until it is desired to dump them.

The object of our invention is to provide a simple and practical street-sweeper of this type which will sweep while turning corners of streets or while the machine is turning completely around and one which will enable the broom to thoroughly sweep all ruts and crevices in the streets while in operation.

Our invention consists, generally stated, in the novel construction, arrangement, and combination of parts, as hereinafter more specifically set forth and described, and particularly pointed out in the claims.

To enable others skilled in the art to which our invention appertains to construct and use the sweeper, we will describe the same more fully, referring to the accompanying drawings, in which—

Figure 1 is a side view of our improved street-sweeper, showing some of the parts removed and the broom in position for operation. Fig. 2 is a top or plan view of the street-sweeper, showing on one side a horizontal section through the axle, driving mechanism, and broom. Fig. 3 is a detail sectional view showing the conveyer and conveyer-frame. Fig. 4 is a detail view showing the device for operating the conveyer and frame. Fig. 5 is a detail view showing the gearing mechanism for operating the broom and conveyer. Figs. 6 and 7 are detail views showing the latch device for tilting the tank and dirt-receptacle. Figs. 8 and 9 are enlarged detail views of a portion of the broom and its frame. Fig. 10 is a vertical section through casing and tank, showing the door open ready for the tank to be dumped; and Figs. 11 and 12 are enlarged views of the removable journal-bearings for the axle.

Like characters herein indicate like parts in each of the figures of the drawings.

Our improved street-sweeper is constructed upon the same general plan as and relates to certain improvements upon the construction shown in Letters Patent of the United States No. 605,415, granted to William Franz on July 7, 1898, and is provided with the axle A, upon which are loosely mounted the two driving-wheels B. The spokes $b$ on the driving-wheels B are clamped together by means of plates $b'$ $b^2$, and the plates $b'$ are provided with hubs $b^6$, which are babbitted at $b^4$ and encircle the axle A. A dirt receptacle or tank C is rigidly secured to the axle A between the wheels B by means of the collar $c$ on the side of the tank C and provided with an opening C' therein. Fitting around the axle A are the conveyer-wheels $d$, which are located on the outside and on each side of the tank C and are provided with the hubs $d'$ thereon, having bushings $d''$ thereon loosely surrounding said axle A. Flanges $d^2$ are formed on the inner faces of the conveyer-wheels $d$ for securing the conveyers D thereto, which are preferably formed of rubber or other flexible material, such as soft thin metal, &c. These conveyers D are preferably four in number and extend across the space between the tank C and casing E, being secured by angle-bars $d^3$, connected to plates $d^4$, which are secured to the flanges $d^2$ on the wheels $d$. The casing E is between the driving-wheels B and is secured around the axle A to fit over and around the tank C and conveyers D, being provided with the rear portion, which extends over the broom F, located in rear of the axle A and operated therefrom, as hereinafter described. The casing E is secured to and is supported upon the frames E', located on each side thereof and composed of the upper bars $E^2$ $E^3$ and the lower bar $E^4$ for supporting the platform $E^5$. The casing E is provided with the removable upper portion $E^6$, which is secured to the upper bars $E^2$ $E^3$ of the frames E' by the bolts $E^7$ through angle-bars $E^8$ on each side of the portion $E^6$, and is also provided with the hinged door $E^9$ on the top thereof for examination of the interior of the sweeper. The sweeper is supported at its rear by means of the caster-wheel $e$, which travels upon the ground and is adapted to turn in any direction at will and is secured on the end of a shaft $e'$, which passes up through bearings $e^2$, secured to the frame $E'$, and is held therein by means of a nut $e^3$, secured to the upper end of the shaft $e'$ and fitting against a plate $e^4$, secured to the frames $E'$. A spiral spring $e^5$ extends around the shaft $e'$ between the bearings $e^2$ to allow the wheel $e$ to take up any unevenness in the streets, &c. The casing E is provided at its bottom with a swinging door G, which covers an opening in the casing and carries at its rear end the apron $g$, which is preferably formed of rubber and is secured to the door G in any suitable manner. The door G is supported on each side of the casing E by the straps $g'$ $g^2$, which are pivoted to the door and to bearings $g^3$ $g^4$, secured to the lower bars $E^4$ of the frames $E'$. A bar $g^5$ is also pivoted on each side of the door G adjacent to the strap $g'$ and is connected at one side to a swinging lever $g^6$, secured around a shaft $g^7$, extending across the front of the sweeper and supported in bearings $g^8$ on the upper angle-bars $E^3$, the bar $g^5$ on the opposite side of the door G being connected to a lever $g^9$, which is fulcrumed on the shaft $g^7$ and has a rod $g^{10}$ pivoted thereto at its upper end, which is pivoted to an operating-lever $g^{11}$, fulcrumed in a bearing $g^{12}$ on the platform $E^5$.

Two sets of gearing mechanism are shown for operating the conveyer D and broom F, one set on each side of the sweeper between the wheels B and casing E, as at H, and each set has a gear-wheel $h$ loosely mounted around the hubs $b^3$ on the plates $b'$ of the wheels B, and between the hubs $b^3$ and gear-wheels $h$ are the bronze bushings $b^5$. The gear-wheels $h$ are adapted to mesh with pinions $h'$, rigidly secured to bronze bushings 1, loosely mounted on the pins $h^2$, which are rigidly secured in the broom-supporting forked frames $h^3$. These forked frames $h^3$ are loosely mounted around the hubs $b^3$ of the wheels B and hubs $d'$ on the conveyer-wheels $d$ around the axle A and are also loosely mounted at their opposite ends around sleeves F' on the broom F. Rigidly secured to the bushings 1 on the pins $h^2$ are the sprocket-wheels $h^4$, around which sprocket-chains $h^5$ pass and over sprocket-wheels $h^6$, loosely mounted with bushings 2 on the axle A, these sprocket-wheels $h^6$ having spring-pawls $h^7$ pivoted thereto, which are adapted to engage with ratchet-wheels $h^8$, rigidly secured to the hubs $d'$ of the conveyer-wheels $d$ around the axle A. Rigidly secured to the sleeves or bushings 1 around the pins $h^2$ are the sprocket-wheels $f$, which are connected to sprocket-wheels $f'$, keyed to sleeves $f^2$ on the broom-shafts $f^3$ by means of sprocket-chains $f^4$, and secured to the shafts $f^3$ of the broom F are the ratchet-wheels $f^5$, which are adapted to be engaged by spring-pawls $f^6$, pivoted to clamping-plates $f^7$, loosely mounted around the shafts $f^3$, and to cup-shaped flanges $f^8$, formed on the sleeves $f^2$, extending over the pawls $f^6$ and connected to the clamping-plates $f^7$. The sleeves F' are loosely mounted around the shafts $f^3$ of the broom F and are provided with the flanges or collars $F^2$ thereon, between which is formed a square portion $F^3$, which is adapted to fit loosely within a square recessed portion $F^4$, formed on the open end $F^5$ of the forked frame $h^3$ to enable the broom F to operate upon any unevenness in the streets. The shafts $f^3$ are provided with cup-shaped end pieces $f^9$, secured thereto, for confining the perforated hollow shaft $f^{10}$, which is formed in semicircles and confines the solid wooden shaft $f^{11}$ therein to form the annular space $f^{12}$ between the shaft $f^{10}$ and shaft $f^{11}$. The splints $f^{13}$ of the broom F are formed of metal, preferably of steel, and a number are preferably passed into one of the perforations $f^{14}$ of the shaft $f^{10}$ and out through the same perforation, being held in place within the space $f^{12}$ by means of a wire or staple $f^{14'}$. The shafts $f^{10}$ $f^{11}$ and splints $f^{13}$ are held together and against displacement by bolts $f^{15}$, passing through the shafts $f^9$ $f^{10}$, and bolts $f^{16}$, passing at right angles to each other through the shafts $f^3$, end pieces $f^8$ and threaded sleeves $f^{17}$ thereon engaging with the shafts $f^4$ for holding the parts together.

Sliding on the hubs $b^3$ of the wheels B on each side of the sweeper between the gear-wheels $h$ and sprocket-wheels $h^6$ are the clutches $i$, which are provided with engaging faces $i'$ thereon for engaging with engaging faces $i^2$ on the gear-wheels $h$, and these clutches $i$ being provided with annular grooves $i^3$ on their outer end faces with which projections $i^4$ on the ends of crank-arms $i^5$ engage. These crank-arms $i^5$ are mounted or pivoted around upright shafts $i^6$, journaled in brackets $i^7$ $i^8$, supported and secured on the upper and lower bars $E^2$ and $E^4$ of the frames $E'$, and the upper end of the upright shafts $i^6$ are provided with crank-arms $i^9$ at right angles to the crank-arms $i^5$, with which rods $i^{10}$ $i^{11}$ are pivoted and extend to the rear of the sweeper. The rod $i^{10}$ is pivoted to an arm $i^{12}$ on the shaft $i^{13}$, extending across the sweeper and supported in bearings $i^{14}$ on the platform $E^5$, and the rod $i^{11}$ is pivoted to an operating-lever $i^{15}$, fulcrumed on the shaft $i^{13}$. Mounted in bearings on the platform $E^5$ is the shaft $j$, which is provided with the arms $j'$, secured at each end thereof, having forked ends $j^2$ for engaging with a rod $j^3$, extending down on each side of the sweeper and being pivotally mounted in a bearing $j^4$ on the forked frames $h^3$. The rods $j^3$ pass through the bearing-sleeves $j^4$, pivoted in the forked ends $j^2$ of the arms $j'$ and are held therein by nuts $j^5$, engaging with the upper ends of the rods $j^3$, and a spiral spring $j^6$ is secured around each one of the rods $j^3$ between the sleeves $j^4$ and collars $j^7$ thereon. Secured to the shaft $j$ is the segmental worm-gear $k$, which is adapted to engage or mesh with a worm-wheel $k'$, securely mounted upon an upright shaft $k^2$, which is supported by the bracket $k^3$, resting upon the platform $E^5$. An operating-crank $k^4$ for raising and lowering the broom F is connected by a disk $k^5$ to the upper end of the shaft $k^2$, and a series of lugs or projections $k^6$ are formed on the under face of the disk $k^5$, with which the upper end of a rod $k^7$, supported in bearings $k^8$ $k^9$ on the brackes $k^3$, engages. A spiral spring $k^{10}$ encircles the rod $k^7$ between the bearings $k^8$ $k^9$, and a lug or projection $k^{11}$ is formed on the lower end of the rod $k^7$ for releasing the rod $k^7$ from engagement with the lugs $k^6$ on the disk $k^5$ when desired. The axle A is journaled in the removable journal-bearings A', which are adapted to slide in the journal-boxes $A^2$, secured to the frames E', and are held in place by the blocks $A^3$, fitting within the journal-boxes $A^2$. Rigidly secured to each end of the axle A beyond the wheels B is the collar $l$, which is provided with a flange portion $l'$ thereon, to which is secured the T-bar $m$, and these T-bars $m$ extend forward to the front of the sweeper and are removably secured to plates $n'$, secured to the cross-bar $n$ in front of the wheels B in the following manner: The plate $n'$ is provided with a flange $n^2$ thereon, projecting through a hole in the plate $m$, and having a seat $n^3$ therein for the reception of a lug $n^4$ on a plate or bar $n^5$, which is held in engagement with the seat $n^3$ by a spring-bar $n^6$, secured to the T-bars $m$, and a plate or stop $n^7$ is also secured to the T-bars $m$ to hold the lug $n^4$ in proper position for engagement in the seat $n^3$ when the T-bars $m$ are released to dump the tank C C. The cross-bars $n$ have also secured thereto braces O, which are secured to brackets O', connected by a plate $O^2$ for supporting a tongue or shafts (not shown) which fit within the angle-bars $O^3$ on the brackets O for hauling the sweeper. A seat for the driver or operator can be secured to the platform $E^5$ in such position as to control and operate the various devices above mentioned.

The operation of our improved street-sweeper is as follows: When it is desired to use the machine to sweep and the broom F is lowered against the street-surface, the operator grasps the lever $i^{15}$ and pulls the same back, which, through the rods $i^{10}$ $i^{11}$ and crank-arms $i^5$, will permit the projections $i^4$ to throw the clutches $i$ into engagement with the gear-wheels $h$ and the axle A. As the machine is hauled the driving-wheels B will revolve and turn the gear-wheels $h$, which, being in mesh with the pinions $h'$ on the pins $h^2$, will act to turn the sprocket-wheels $f$ on the pins $h^2$ and through the sprocket-chains $f^4$ engaging with said sprocket-wheels $f$ and the sprocket-wheels $f'$ on the sleeves $f^2$, surrounding the broom-shafts $f^3$ of the broom F, will act to revolve the broom F to sweep the dirt or other material into the casing E, where it is taken up by the conveyers D. By such a movement of the gear-wheels $h$ the sprocket-wheels $h^4$ on the pins $h^3$ are also revolved, and through the sprocket-chains $h^5$ engaging therewith and with the sprocket-wheels $h^6$, loosely mounted around the axle $a$, will act to revolve conveyer-wheels $d$ in a reverse direction from the wheels B through the ratchet-wheels $h^8$ being connected to the sprocket-wheels $h^6$ by their spring-pawls $h^7$ and these ratchet-wheels $h^8$ being rigidly connected to said hubs $d'$ of the conveyer-wheels $d$. As the conveyers D are revolved over the tank C the dirt or other sweepings thrown up into the casing E by the broom F will be caught by the conveyers D and deposited into the tank C through its opening C' when the conveyers D pass over the same and when the broom F is in operation, and the sweepings will be insured to be thrown into the casing E by the apron $g$ on the door G, which drags on the street-surface, so as to prevent any dirt or other sweepings from being thrown forward of the casing. When the tank C has been sufficiently filled with sweepings and it is desired to dump the same, all that is necessary is to grasp the lever $g^{11}$ and pull the same backward, which will revolve the shaft $g^7$ through the levers $g^6$ and $g^9$, connected to the bars $g^5$, and will permit the door G to swing out to the position shown in dotted lines through the medium of the straps $g'$ $g^2$, pivoted thereto. The operator raises the broom F, as hereinafter described, then grasps the free ends of the spring-bars $n^6$ and frees the lugs $n^4$ from the seats $n^3$ in the flanges $n^2$ of the plates $n'$ on the cross-bar $n$, when T-bars $m$ can be raised and the tank C turned backward, which will allow the sweepings to drop therefrom through the opening C' and through the opening G' in the casing E onto the street or dumping-place, as desired. After the sweepings are removed from the tank C it can be returned to place by pulling down on the bars $m$ and allowing the lugs $n^4$ to spring within the seats $n^3$ of the plates $n'$, and the door G can be returned to place by pushing forward the lever $g^{11}$, which will revolve the shaft $g^7$ and return the levers $g^6$ and $g^9$, connected to the bars $g^5$, to swing the door G to its normal position by its straps $g'$ $g^2$.

In case it is desired to raise the broom F all that is necessary is for the operator to pull down the rod $k$ by pressing down with his foot on the lug $k^{11}$, which will free the rod $k$ from engagement with the projections $k^6$ on the disk $k^5$, when the crank $k^4$ on the disk $k^5$ can be turned so as to revolve the shaft $k^2$ and with it the worm-wheel $k$, which meshing into the worm-gear $k$ will revolve the shaft $j$ and raise the arms $j'$, rod $j^3$, and broom F, connected thereto, to the position shown in dotted lines. The broom F can be lowered by reversing the operating-crank $k^4$ and with it the worm-wheel $k'$ on the shaft $k^2$ and gear-wheel $k$ on the shaft $j$, so revolving the shaft $j$ and lowering the arms $j'$, rods $j^3$, and broom F. The locking device, consisting of disk $k^5$ and rod $k$, is to lock the broom F in any desired position.

In case it is desired that the broom F operate and sweep in turning corners the outer ratchet-wheel $h^8$, surrounding the axle A, and the outer ratchet-wheel $f^5$ on the broom F will revolve to operate the conveyers D and broom F, while the inner ratchet-wheel $h^8$, surrounding the axle A, and the inner ratchet-wheel $f^5$ on the broom F, will revolve or turn backward and their pawls $h^7$ and $f^6$, respectively, will slip over the inner ratchet-wheels $h^8$ and $f^5$, in order to allow the operating mechanism on the inner side of the sweeper to remain stationary while the operating mechanism on the outer side of the sweeper is working the conveyers D and broom F, so that the sweeper will relieve itself in turning corners or around either to the right or left.

It will thus be seen that our improved street-sweeper is cheap, practical, and simple in its construction and operation. The machine is strong and durable and will not get out of order and will greatly reduce the labor, time, and expense in this class of work.

Various modifications in the construction and operation of the various parts of the machine may be resorted to without departing from the spirit of the invention or sacrificing any of its advantages.

What we claim as our invention, and desire to secure by Letters Patent, is—

1. In a street-sweeper, the combination of an axle, driving-wheels loosely mounted thereon, a casing supported around the axle, a receiving-tank, conveyers between the casing and tank, a rotatable broom mounted in a frame in the rear of the axle, shafts within the broom-frame, sprocket-wheels on said shafts connected by sprocket-chains with sprocket-wheels on shafts driven through gearing by the driving-wheels, and sprocket-wheels on said last-named shafts connected by sprocket-chains with sprocket-wheels on the conveyer-shafts, whereby the conveyers are driven in a direction reverse to that of the driving-wheels.

2. In a street-sweeper, the combination of an axle, driving-wheels loosely mounted thereon, a casing supported around the axle, a tank secured to the axle, conveyers between the casing and tank, a rotatable broom mounted in a frame in the rear of the axle, shafts within the broom-frame, gear-wheels connected to the driving-wheels and meshing with pinions on transverse shafts, sprocket-wheels on said transverse shafts connected by sprocket-chains to sprocket-wheels on the broom-shafts, and sprocket-wheels on said transverse shafts connected by sprocket-chains with sprocket-wheels on the conveyer-shafts, whereby the conveyers are driven in a direction reverse to that of the driving-wheels.

3. In a street-sweeper, the combination of an axle, driving-wheels loosely mounted thereon, a receiving-tank secured to the axle, a cross-bar to which the draft mechanism is attached, a horizontal bar at each end of the axle and rigidly secured thereto, and mechanism consisting of a flange at each end of the cross-bar and a lug or bolt on each of the horizontal bars engaging with the flanges, for securing the two bars removably together.

4. In a street-sweeper, the combination of an axle, driving-wheels loosely mounted thereon, a receiving-tank secured to the axle, a horizontal bar at each end of the axle and rigidly secured thereto, a cross-bar to which the draft mechanism is attached having a flange at each end passing through an opening in the horizontal bars, and a lug or bolt on each horizontal bar adapted to engage with a seat in the flange to lock the bars together.

5. In a street-sweeper, the combination of an axle, supporting and driving wheels loosely mounted around the axle, a rotatable broom mounted in the rear of the axle, connections from the driving-wheels to the broom, adjustable spring-rods secured to said broom and pivotally swiveled in sleeves pivoted in arms secured to a shaft supported above the broom, a worm-gear wheel on said shaft meshing with a worm on an upright shaft, and an operating wheel or disk on said upright shaft having lugs or projections thereon adapted to be engaged by a spring-operated rod supported adjacent to said upright shaft.

6. In a street-sweeper, the combination of an axle, supporting and driving wheels loosely mounted around the axle, a rotatable broom mounted in the rear of the axle, connections from the driving-wheels to the broom, adjustable spring-rods secured to said broom and pivotally swiveled in sleeves pivoted in arms secured to a shaft supported above the broom, a worm-gear wheel on said shaft meshing with a worm on an upright shaft, an operating wheel or disk on said upright shaft having lugs or projections thereon adapted to be engaged by a spring-operated rod supported adjacent to the upright shaft, and a projection or treadle on the lower end of said spring-rod for releasing the same from the lugs on the disk.

7. In a street-sweeper, the combination of an axle, driving-wheels loosely mounted around the axle, a rotatable broom adjustably mounted around the axle, connections from the driving-wheels to the broom, and sleeves loosely mounted on said broom having a square portion thereon adapted to loosely engage with square portions on the open ends of the broom-frames.

8. In a street-sweeper, the combination of an axle, driving-wheels loosely mounted around the axle, a casing supported around the axle, a tank rigidly secured to the axle, conveyer-wheels between the casing and tank, a rotatable broom adjustably mounted in the rear of the axle, connections from the driving-wheels to the broom, and a series of flexible conveyers secured to the conveyer-wheels adapted to bear against the casing and tank in movement.

9. In a street-sweeper, the combination of an axle, driving-wheels loosely mounted around the axle, a casing supported around the axle, a tank rigidly secured to the axle, conveyer-wheels between the casing and tank, a rotatable broom adjustably mounted in the rear of the axle, connections from the driving-wheels to the broom, and a plate extending across and secured to the conveyer-wheels having a series of flexible conveyers secured thereto and adapted to bear against the casing and tank in movement.

10. In a street-sweeper, the combination of an axle, a casing supported around the axle and provided with an opening in the bottom thereof, a tank rigidly secured to said axle, means on said axle for dumping and holding the tank in place, a removable door fitting over the opening in the bottom of the casing to allow the tank to be emptied, straps pivoted to said door and to the casing, and a series of levers pivoted to said door for raising and lowering the same.

11. In a street-sweeper, the combination of an axle, a casing supported around the axle and provided with an opening in the bottom thereof, a tank rigidly secured to said axle, means on said axle for dumping and holding the tank in place, a removable door fitting over the opening in the bottom of the casing to allow the tank to be emptied, straps pivoted to said door and to the casing, bars pivoted to said door, and a series of levers pivoted to said bars for raising and lowering the door.

12. In street-sweepers, the combination of an axle, a casing supported around the axle and provided with an opening in the bottom thereof, a tank rigidly secured to said axle, means on said axle for dumping and holding the tank in place, a removable door fitting over the opening in the bottom of the casing to allow the tank to be emptied, straps pivoted to said door and to the casing, bars pivoted to said door and pivoted to levers mounted around a shaft supported in front of the casing, and a rod pivoted to the upper end of one of said levers and pivoted to an operating-lever fulcrumed on the casing.

13. In a street-sweeper, the combination of an axle, driving-wheels loosely mounted on the axle, a casing supported on the axle, a rotatable broom mounted in the rear of the axle, gear-wheels loosely mounted on the hubs of said driving-wheels and having connections to said broom for operating the broom, clutches mounted on hubs of the driving-wheels and having faces adapted to engage with faces on said gear-wheels, upright shafts journaled on each side of said casing, crank-arms on the upright shafts for engaging with said clutches, arms mounted on said upright shafts, rods pivoted to said arms, said rods being connected to a cross-shaft and operating-lever having a direct pull, and mechanism by which said lever may be locked in position.

14. In a street-sweeper, the combination of an axle, a casing supported around the axle, a frame formed of an upper and lower bar secured to each side of said casing, a journal-box secured to said frame on each side of the sweeper and a removable journal-bearing seated in each of said journal-boxes.

In testimony whereof we have hereunto set our hands, at Pittsburg, in the county of Allegheny and State of Pennsylvania, this 5th day of September, A. D. 1898.

JOSEPH C. KANE.
ANTHONY J. LIST.

Witnesses:
J. N. COOKE,
G. K. WRIGHT.